United States Patent
Bhat et al.

(10) Patent No.: US 10,165,088 B2
(45) Date of Patent: Dec. 25, 2018

(54) PROVIDING UNIT OF WORK CONTINUITY IN THE EVENT INITIATING CLIENT FAILS OVER

(71) Applicant: INTERNATIONAL BUSINESS MACHINES CORPORATION, Armonk, NY (US)

(72) Inventors: Chethan Bhat, Karnataka (IN); Rajesh Lalgowdar, Karnataka (IN); Lohitashwa Thyagaraj, Karnataka (IN)

(73) Assignee: International Business Machines Corporation, Armonk, NY (US)

(*) Notice: Subject to any disclaimer, the term of this patent is extended or adjusted under 35 U.S.C. 154(b) by 158 days.

(21) Appl. No.: 15/226,660

(22) Filed: Aug. 2, 2016

(65) Prior Publication Data
US 2018/0041382 A1  Feb. 8, 2018

(51) Int. Cl.
| | |
|---|---|
| G06F 15/16 | (2006.01) |
| H04L 29/06 | (2006.01) |
| H04L 29/08 | (2006.01) |
| H04L 29/14 | (2006.01) |

(52) U.S. Cl.
CPC ............ *H04L 67/42* (2013.01); *H04L 29/06* (2013.01); *H04L 67/10* (2013.01); *H04L 67/2842* (2013.01); *H04L 69/40* (2013.01)

(58) Field of Classification Search
CPC ............................... H04L 12/24; H04L 29/06
See application file for complete search history.

(56) References Cited

U.S. PATENT DOCUMENTS

| | | | | |
|---|---|---|---|---|
| 5,642,503 | A * | 6/1997 | Reiter | G06F 17/30356 |
| 5,991,414 | A * | 11/1999 | Garay | H04L 9/302 |
| | | | | 380/30 |
| 7,720,992 | B2 | 5/2010 | Brendle et al. | |
| 9,460,177 | B1 * | 10/2016 | Pawar | G06F 17/30227 |
| 2002/0010797 | A1* | 1/2002 | Moulton | H04L 69/04 |
| | | | | 709/247 |
| 2002/0035590 | A1 | 3/2002 | Eibach et al. | |

(Continued)

OTHER PUBLICATIONS

"Overview of Transparent Application Failover (TAF)", Oracle RAC Cluster Tips by Burleson Consulting, www.dba-oracle.com/real_application_clusters_rac_grid/taf.html, Last Accessed Aug. 2, 2016, 5 Pages.

*Primary Examiner* — Hieu T Hoang
(74) *Attorney, Agent, or Firm* — Tutunjian & Bitetto, P.C.; Scott Dobson

(57) ABSTRACT

A method is provided for providing unit of work continuity between a client device and a server when the client device initially fails to complete an ongoing unit of work. The method includes temporarily storing, in a temporary storage location in the server, in-doubt messages sent to the server for the ongoing unit of work, when the client device disconnects from the server without committing the ongoing unit of work so that the client device does not have to resend the in-doubt messages to the server. The method further includes utilizing unique hash-codes to identify the in-doubt messages the client device had earlier sent so that the server can retrieve the in-doubt messages from the temporary storage location and include the in-doubt messages as part of the ongoing unit of work to be committed by the client device. The ongoing unit of work is only part of an entire transaction.

19 Claims, 7 Drawing Sheets

(56) References Cited

U.S. PATENT DOCUMENTS

| | | | | |
|---|---|---|---|---|
| 2006/0136930 A1* | 6/2006 | Kaler | ................... | G06F 9/4843 |
| | | | | 718/105 |
| 2007/0081518 A1* | 4/2007 | Jain | ................... | H04L 29/06027 |
| | | | | 370/352 |
| 2011/0314070 A1* | 12/2011 | Brown | .............. | G06F 17/30115 |
| | | | | 707/827 |
| 2013/0198265 A1* | 8/2013 | Kumar | .................. | H04L 67/141 |
| | | | | 709/203 |

* cited by examiner

PROVIDING UNIT OF WORK CONTINUITY IN THE EVENT INITIATING CLIENT FAILS OVER

BACKGROUND

Technical Field

The present invention relates generally to information processing and, in particular, to providing unit of work continuity in the event the initiating client fails over.

Description of the Related Art

Transactions play a very important role within the enterprise system to provide data integrity. Transactions provide an "all-or-nothing" proposition, stating that each unit of work performed in a resource manager (messaging or database) must either complete in its entirety or have no effect whatsoever. A transaction can be considered as a collection of two or more units of work One of the key aspects of transactions is to recover from failures. Most of the existing solutions to recover transactions revolve around server crashing and restarting. There is no solution to deal with transaction recovery or continuity of the in-doubt transactions when the client that started the transaction fails and restarts. Currently, when the client crashes in between the transaction (i.e., the client fails without issuing the commit), the only solution is for the resource managers to just roll back all the messages.

Presume we have a messaging application that sends several (100 messages) messages, each of 1 MB size within a single group. As per the transaction policy until the client issues the commit, the resource/transaction manager will not make the messages available for consumption. Presume after the client sent 95 messages, the client crashes. Since the client crashed, the resource manager just rolls back all the 95 messages.

Currently, when the client application fails over and reconnects, the client has to again resend all the messages from starting. This causes a significant congestion of the network creating performance, latency and network bandwidth issues.

All of the prior art only addresses server side recovery of messages when the server crashes and restarts. None of the prior art address providing continuity at a unit of work level in the event the client crashes and reconnects.

SUMMARY

According to an aspect of the present principles, a method is provided that, in turn, provides unit of work continuity between a client device and a server when the client device initially fails to complete an ongoing unit of work. The method includes temporarily storing, in a temporary storage location in the server, in-doubt messages sent to the server for the ongoing unit of work, when the client device disconnects from the server without committing the ongoing unit of work so that the client device does not have to resend the in-doubt messages to the server. The method further includes utilizing unique hash-codes to identify the in-doubt messages the client device had earlier sent so that the server can retrieve the in-doubt messages from the temporary storage location and include the in-doubt messages as part of the ongoing unit of work to be committed by the client device. The ongoing unit of work is only part of an entire transaction.

According to another aspect of the present principles, a computer program product is provided that, in turn, provides unit of work continuity between a client device and a server when the client device initially fails to complete an ongoing unit of work. The computer program product includes a computer readable storage medium having program instructions embodied therewith. The program instructions are executable by a computer to cause the computer to perform a method. The method includes temporarily storing, in a temporary storage location in the server, in-doubt messages sent to the server for the ongoing unit of work, when the client device disconnects from the server without committing the ongoing unit of work so that the client device does not have to resend the in-doubt messages to the server. The method further includes utilizing unique hash-codes to identify the in-doubt messages the client device had earlier sent so that the server can retrieve the in-doubt messages from the temporary storage location and include the in-doubt messages as part of the ongoing unit of work to be committed by the client device. The ongoing unit of work is only part of an entire transaction.

According to yet another aspect of the present principles, a system is provided. The system includes a server configured to temporarily store, in a temporary storage location in the server, in-doubt messages sent to the server for an ongoing unit of work, when a client device disconnects from the server without committing the ongoing unit of work so that the client device does not have to resend the in-doubt messages to the server. The server is further configured to utilize unique hash-codes to identify the in-doubt messages the client device had earlier sent so that the server can retrieve the in-doubt messages from the temporary storage location and include the in-doubt messages as part of the ongoing unit of work to be committed by the client device. The ongoing unit of work is only part of an entire transaction.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION

The present principles are directed to providing unit of work continuity in the event the initiating client fails over.

As used herein, the term "unit of work" refers to one or more actions and/or occurrences relating to a transaction, but not all of the actions relating to that transaction. That is, a unit of work is limited to a subset of the actions required to be performed or to occur in a transaction.

As an example, consider the following. In the example, a transaction is defined as involving the transmission of 100 messages. A unit of work for that transaction can span one or more subsets of the entire 100 messages. In further detail for this example, a first unit of work can involve sending the first 50 messages, while a second unit of work can involve sending 49 messages, while a third and final unit of work for that transaction can involving sending the 1 final message, for a total of 100 messages involves across all of the preceding units of work.

In the case where a unit of work is suspected of being in-doubt, the present principles provide a solution that avoids having to resend the in-doubt messages from the client to the server due to the server discarding the same. In such a case, the present principles advantageously provide a way for the server to identify that it has received these in-doubt messages and to retrieve these messages from a temporary storage of the server, thus saving all of the resources involved in retransmission of these messages. As is readily appreciated by one of ordinary skill in the art, the present principles can be applied to the above and numerous other scenarios, as readily envisioned by one of ordinary skill in the art given the teachings of the present principles provided herein, while maintaining the spirit of the present principles.

As used herein, the term "in-doubt message" refers to a message for which a commit or rollback instruction for the overall transaction that includes the unit of work that, in turn, includes the message, has yet to be received from the client. That is, as used herein, the term "in-doubt messages" refer to messages in a unit of work that have been prepared but a decision (commit/rollback) has yet to be conveyed from the client to the server.

Thus, the present principles are advantageously directed to the concept of "unit of work efficiency and continuity" for client fail overs, where the present principles efficiently attempt to continue the unit of work before discarding the messages. As used herein, the term "fail over" and similar terms refer to the case where a client has disconnected from the server before a decision (commit or rollback) has been received for an overall transaction.

Figure 1:
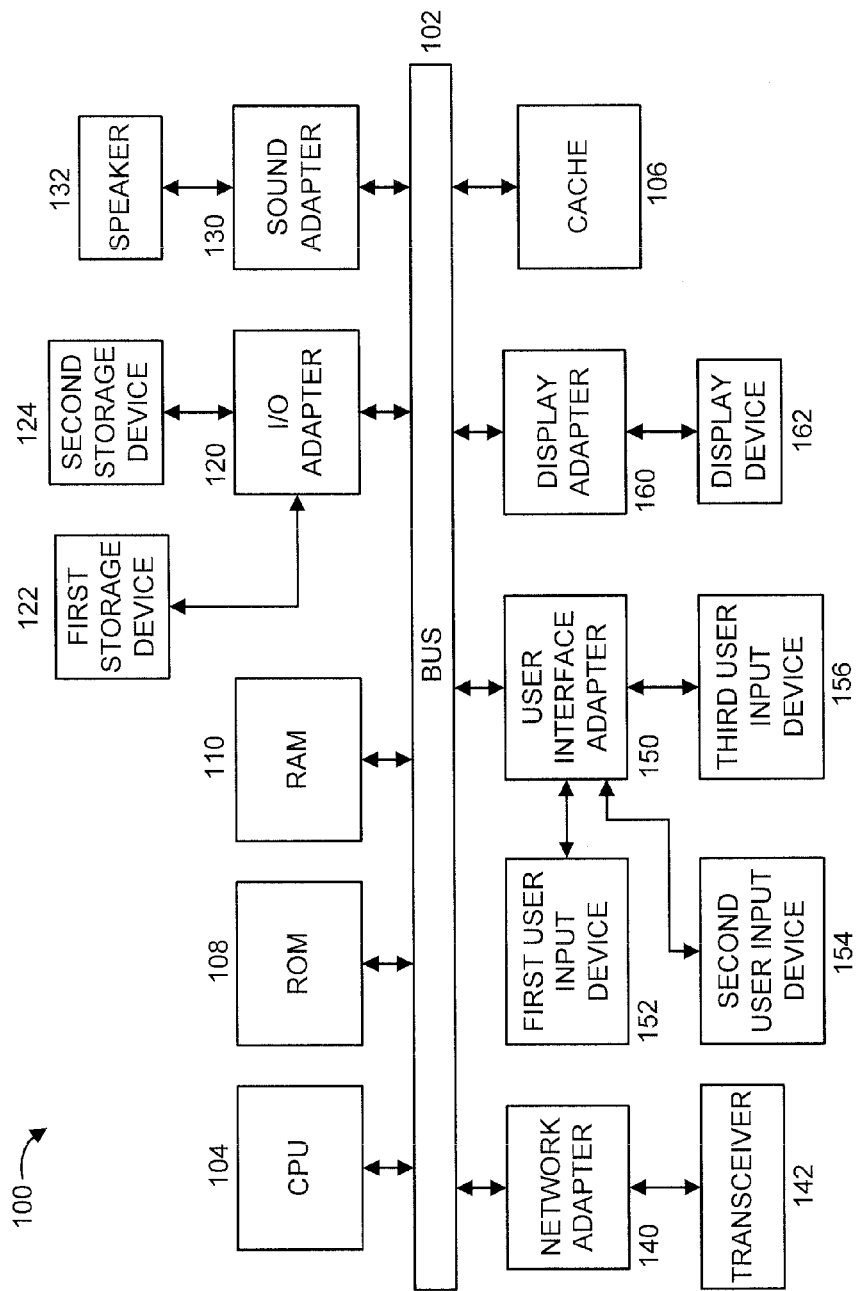
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
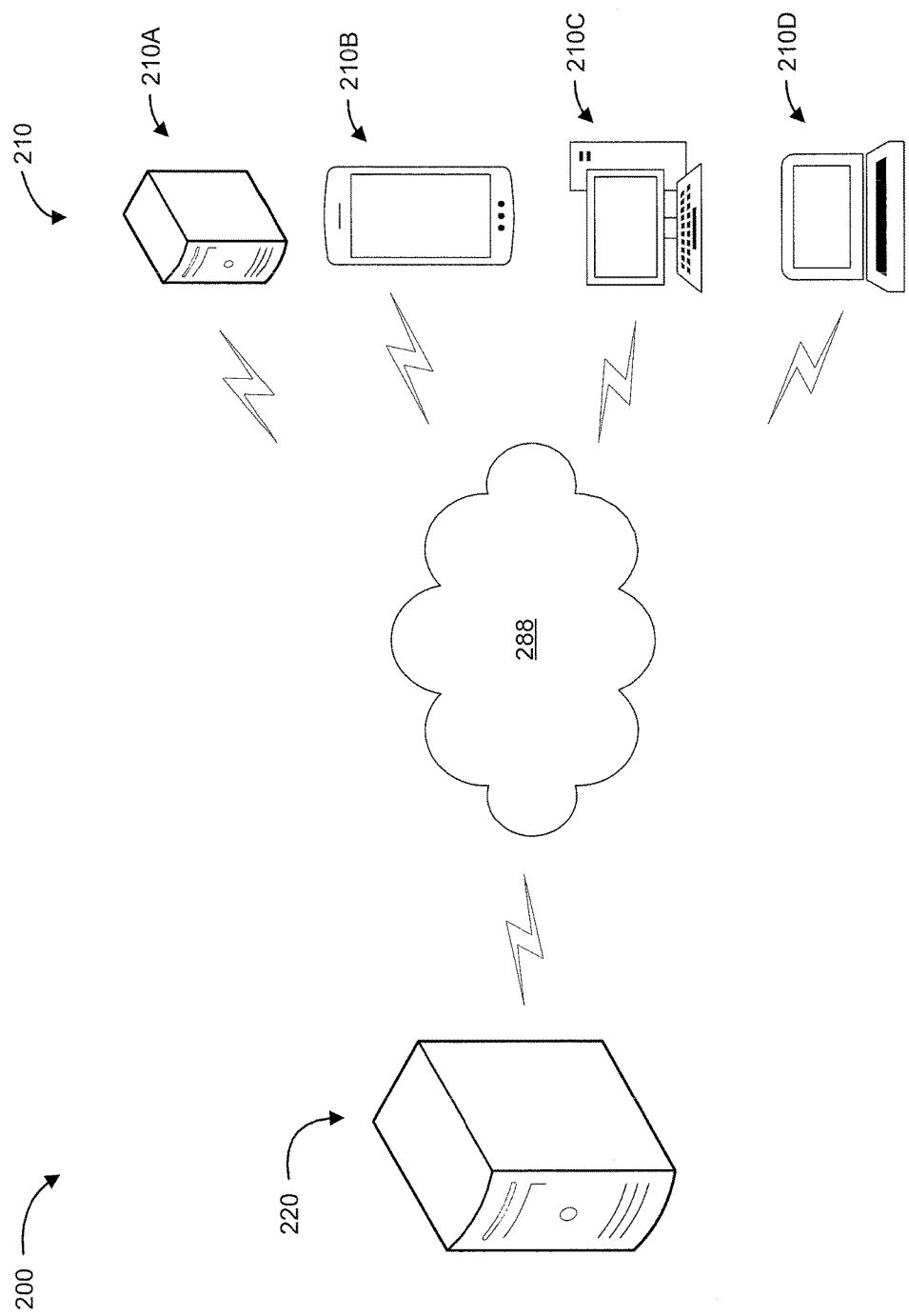
FIG. 2 shows an exemplary system for providing unit of work continuity in the event the initiating client fails over, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
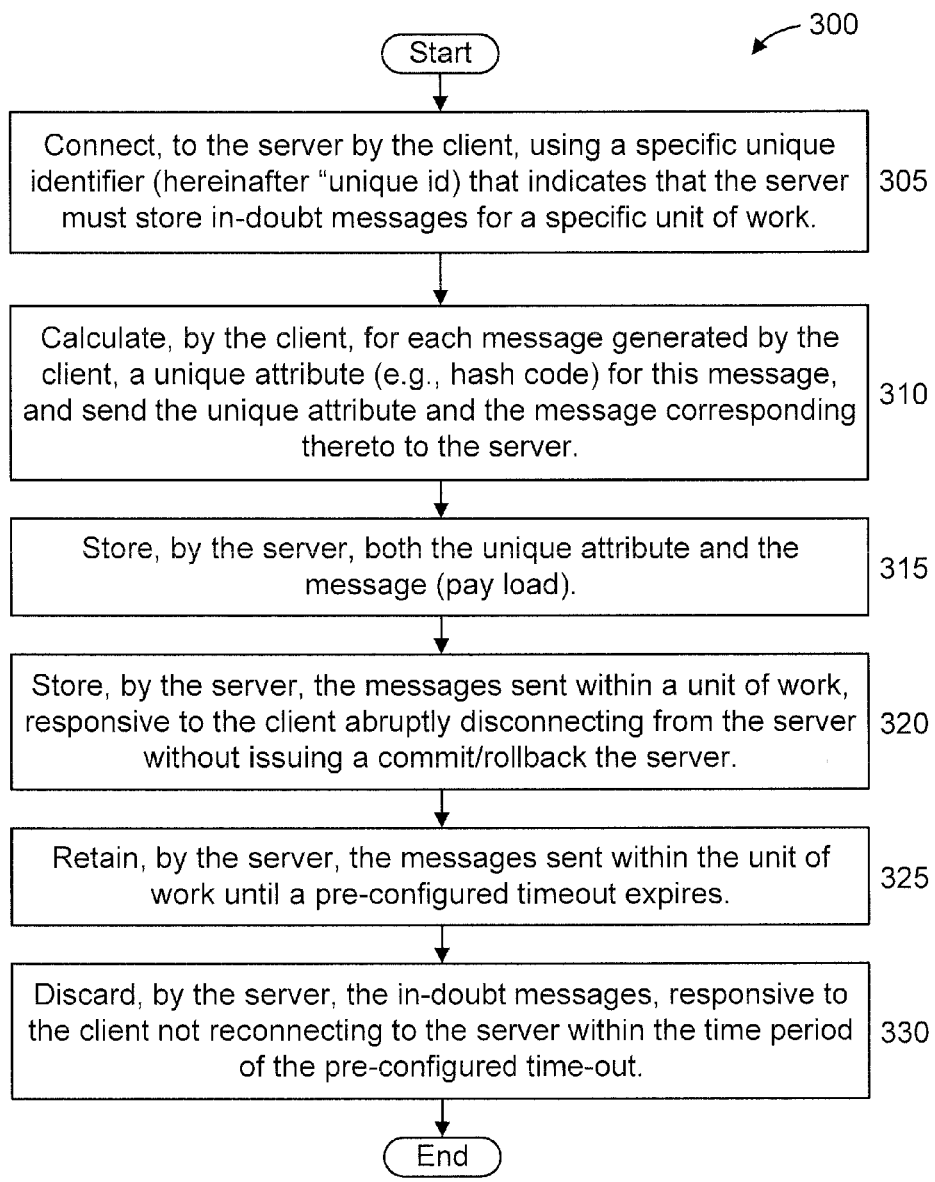
FIG. 3 shows an exemplary method for server/Resource Manager storage of in-doubt messages, in accordance with an embodiment of the present principles.
Figure 4:
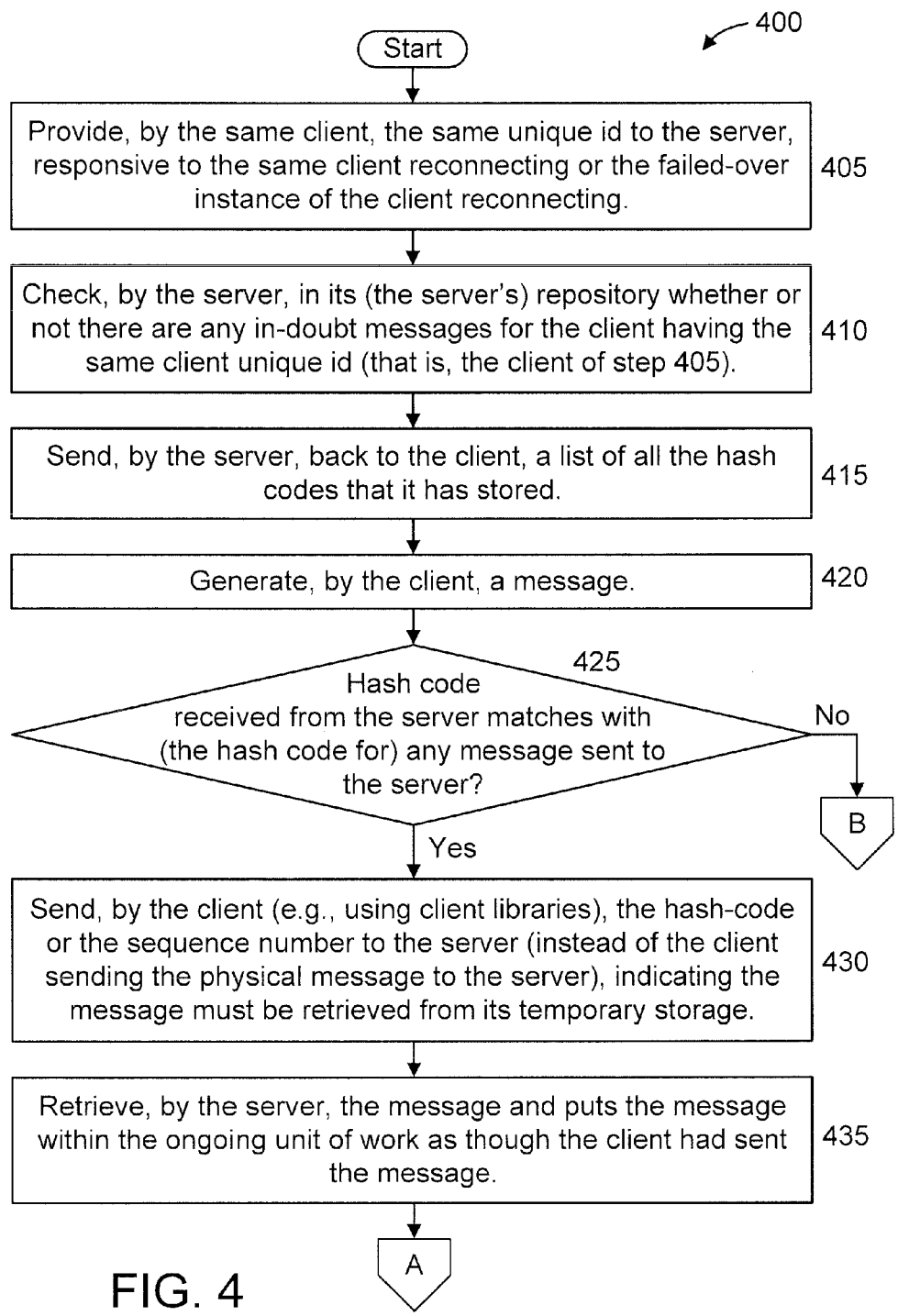
FIGS. 4-5 show an exemplary method for client unit of work continuity and server retrieving stored messages, in accordance with an embodiment of the present principles.
Figure 5:
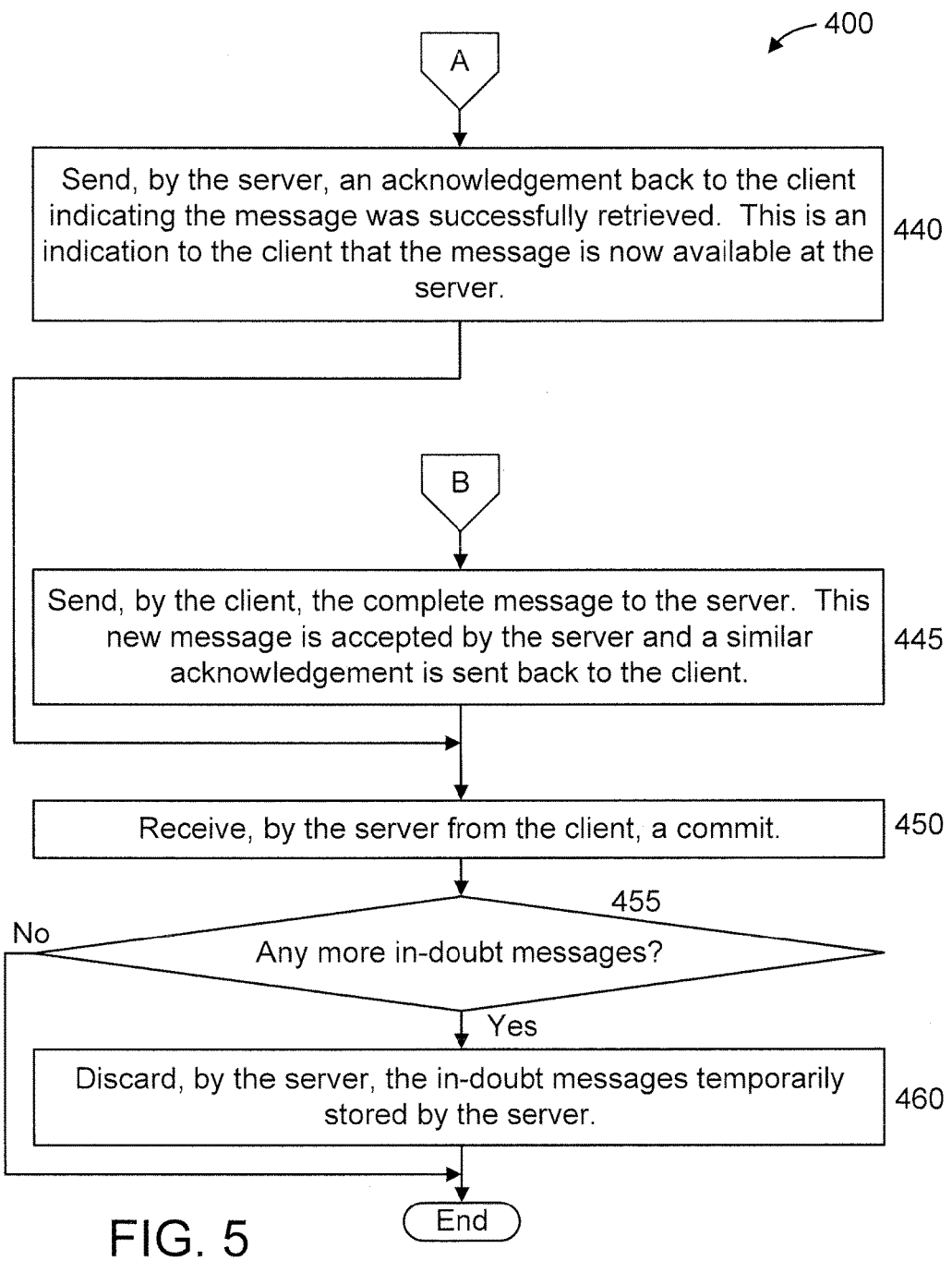

Further, it is to be appreciated that processing system 100 may perform at least part of the method described herein including, for example, at least part of method 300 of FIG. 3 and/or at least part of method 400 of FIGS. 4-5. Similarly, part or all of system 200 may be used to perform at least part of method 300 of FIG. 3 and/or at least part of method 400 of FIGS. 4-5.

FIG. 2 shows an exemplary system 200 for providing unit of work continuity in the event the initiating client fails over, in accordance with an embodiment of the present principles.

The system includes one or more client computing devices (collectively denoted by the figure reference numeral 210) and a server (hereinafter interchangeably referred to as a "resource manager" (RM)) 220. In the embodiment of FIG. 2, three client computing devices are shown, namely client computing devices 210A, 210B, 210C, and 210D. However, for the sake of illustration, the following description and examples will focus on client computing device 210A (hereinafter referred to as "client" 210A in short) as being a failed over client that (unintentionally/undesirably) disconnects from the server 220. As such, for the purposes of the present principles, the client 210A can also be referred to as a "failed-over client" at the times when the client 210A has suffered as fail-over. In an embodiment, system 200 can be implemented using a cloud configuration (see, e.g., FIGS. 6-7).

Further regarding client computing devices 210, the same can involve any type of client computing device. In the embodiment of FIG. 2, the client computing devices 210 include a server 210A, a smartphone 210B, a desktop computer 210C, and a laptop 210D, for the sake of illustration. Of course, other client computing devices can be used. Moreover, in other embodiments, the client computing devices 210 can be of the same type or include at least two of the same type. These and other variations of client computing devices to which the present principles can be applied are readily determined by one of ordinary skill in the art, while maintaining the spirit of the present principles.

The server/resource manager 220 of system 200 differs a transaction manager as known and used in the prior art in that the server/resource manager 220 is able to store and process units of work that in all cases will be less than all of the work required for a transaction. This level of granularity provides many advantages over that provided by a conventional transaction manager, as readily appreciated by one of ordinary skill in the art.

The client 210A and the server 220 are configured to exchange information there between. In an embodiment, the information can be messages. However, any type of information can be involved/exchanged/communicated, while maintaining the spirit of the present principles. For example, the present principles can also be used for databases. As a further example, the present principles can be used for database updates, in databases or database systems where the same can maintain an intermediate state.

The exchange of information can occur over one or more networks (collectively denoted by the figure reference numeral 288). The one or more networks 288 can include any type of networks such as, for example, but not limited to, cellular networks, local area networks, wide area networks, personal area networks, wireless networks, wired networks, any combination of the preceding, and so forth. In the embodiment of FIG. 2, the one or more networks 288 are implemented by one or more wireless networks for the sake of illustration.

In an embodiment, the present principles are configured to provide a solution for the server 220 to temporarily store the in-doubt messages without discarding them when the client 210A disconnects without committing the ongoing unit of work.

In an embodiment, the server 220 is configured to identify the failed-over client 210A that had earlier sent the messages, so that the client 210A does not have to resend all the messages again.

In an embodiment, the present principles are configured to provide a mechanism for the server 220 to send a list of unique hash-codes for the in-doubt message that the server 220 is temporarily storing to the failed over client 210. Each in-doubt message will have its own unique hash-code in order to uniquely identify the specific in-doubt message corresponding to that unique hash code.

In an embodiment, the present principles are configured to allow the failed-over client 210 to check for matching hash-codes in the list sent by the server 220. If a particular hash code is present, then the client 210A just sends back the hash code from the list (that identifies a respective in-doubt message temporally stored by the server 220) instead of the physical message to the server 220. In this way, bandwidth, processing, and other resources are saved while also reducing latency (e.g., involved in a retransmission). Thus, retransmission costs are beneficially avoided by the present principles.

In an embodiment, the present principles are configured to have the server 220 retrieve the message from its temporary stored location and make the message part of the ongoing unit of work to be committed by the client 210A.

Regarding identifying a client as a failed client, in an embodiment, any mechanism can be used to keep an in-flight business object when a unit of work is tagged as "failed". We can, for example, use the identity of the client, similar to the durable subscription clientID principle. In case of a durable subscription, the client always sets its desired clientID, either reading it from the ConnectionFactory, or eXtensible Markup Language (XML) or some other way that only the client knows. Each of the clients essentially set this clientID without server interference. Of course, other mechanisms and approaches can also be used in accordance with the teachings of the present principles, while maintaining the spirit of the present principles. For example, a media access control (MAC) address, unique business data (e.g., a phone number, a unique customer number, a unique business transaction identifier, and so forth), and so forth.

FIG. 3 shows an exemplary method 300 for server/Resource Manager storage of in-doubt messages, in accordance with an embodiment of the present principles. The method 300 involves a server (e.g., server 220) and a failed over client (e.g., client 210A).

At step 305, connect, to the server by the client, using a specific unique identifier (hereinafter "unique id) that indicates that the server must store in-doubt messages for a specific unit of work. In an embodiment, the unique id can be any type of identifier, as long as it can function to identify 2 different clients uniquely and also ensure when a failed-over client reconnects that client can use the same unique id.

At step 310, calculate, by the client, for each message generated by the client, a unique attribute for this message, and send the unique attribute and the message corresponding thereto to the server. The unique attribute could be a hash-code, a custom algorithm to identify the uniqueness of the message, and/or so forth. The unique attribute and the message corresponding thereto (that is, from which, or for which, it was calculated) can be sent in-band (together) or out-of-band (separately), but in both cases associated with each other (the message and its unique attribute). For the sake of illustration, the unique attribute is interchangeably referred to as a hash code.

At step 315, store, by the server, both the unique attribute and the message (pay load).

At step 320, store, by the server, the messages sent within a unit of work, responsive to the client abruptly disconnecting from the server without issuing a commit/rollback the server.

At step 325, retain, by the server, the messages sent within the unit of work until a pre-configured timeout expires.

At step 330, discard, by the server, the in-doubt messages, responsive to the client not reconnecting to the server within the time period of the pre-configured timeout. Thus, as used herein, the term "in-doubt messages" refer to messages in a unit of work that have been prepared but a decision (commit/rollback) has yet to be conveyed to the server.

FIGS. 4-5 show an exemplary method 400 for client unit of work continuity and server retrieving stored messages, in accordance with an embodiment of the present principles. The method 400 involves a server (e.g., server 220) and a failed over client (e.g., client 210A).

At step 405, provide, by the same client, the same unique id to the server, responsive to the same client reconnecting or the failed-over instance of the client reconnecting.

At step 410, check, by the server, in its (the server's) repository whether or not there are any in-doubt messages for the client having the same client unique id (that is, the client of step 405).

At step 415, send, by the server, back to the client, a list of all the hash codes that it has stored.

At step 420, generate, by the client, a message.

At step 425, check, by the client before sending the message generated at step 440, the client libraries to determine whether or not the hash code received from the server matches with (the hash code for) any message sent to the server. If so, then continue to step 430. Otherwise, continue to step 445.

At step 430, send, by the client (e.g., using client libraries), the hash-code or the sequence number to the server (instead of the client sending the physical message to the server), indicating the message must be retrieved from its temporary storage. Step 430 is performed responsive to the hash code (or other unique attribute) matching any message sent by the server (as determined at step 425).

At step 435, retrieve, by the server, the message and puts the message within the ongoing unit of work as though the client had sent the message.

At step 440, send, by the server, an acknowledgement back to the client indicating the message was successfully retrieved. This is an indication to the client that the message is now available at the server.

At step 445, send, by the client, the complete message to the server. This new message is accepted by the server and a similar acknowledgement is sent back to the client. Step 445 is performed responsive to the hash code (or other unique attribute) not matching any message sent by the server (as determined at step 425) such that the client wants to send a new message.

At step 450, receive, by the server from the client, a commit.

At step 455, check, by the server, whether or not there are any more in-doubt messages in its list, responsive to the client (completing the sending of all the messages and) issuing the commit. This could happen if the client generated any new message or did not use the old message. If so, then continue to step 460. Otherwise, terminate the method.

At step 460, discard, by the server, the in-doubt messages temporarily stored by the server. Step 460 is performed in consideration of the fact that the client has issued a commit (received by the server at step 450).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
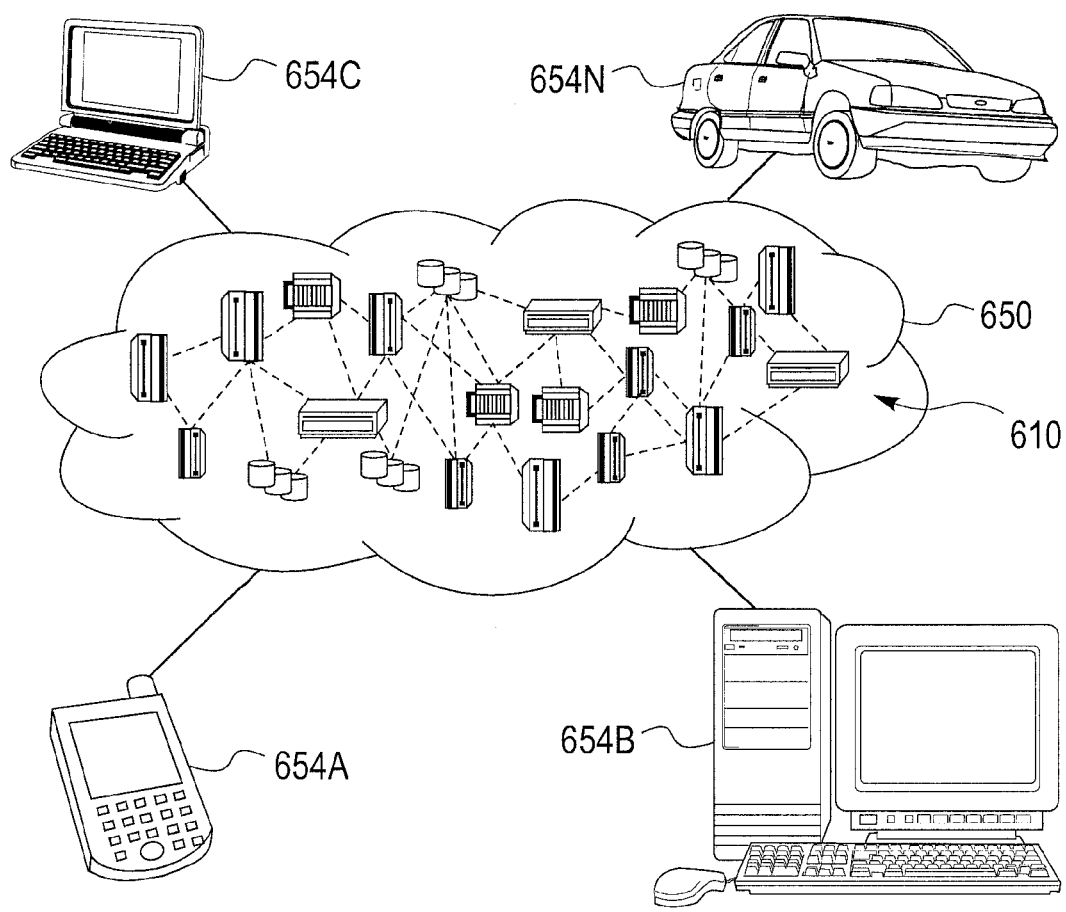
FIG. 6 shows an exemplary cloud computing environment, in accordance with an embodiment of the present principles.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
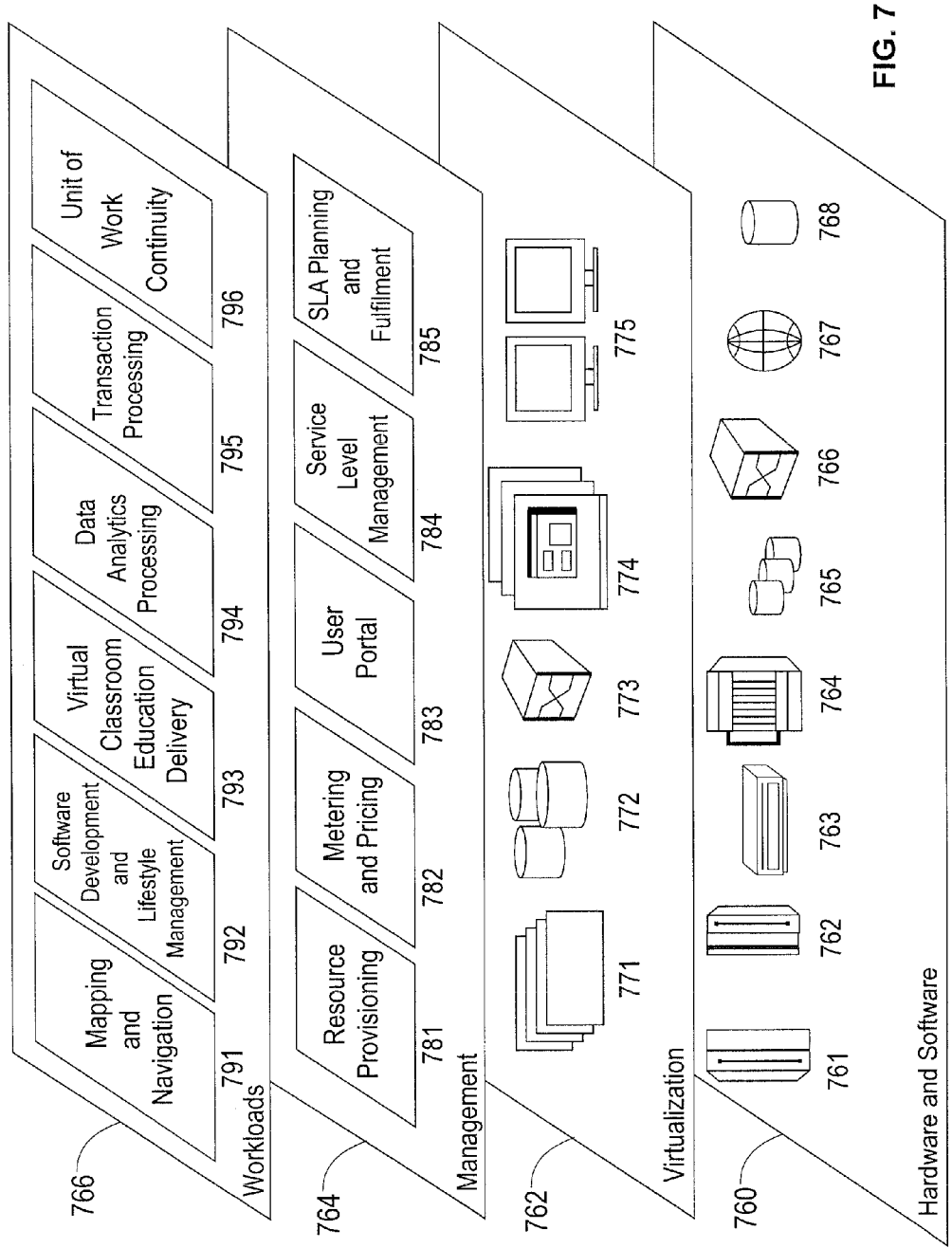
FIG. 7 shows an exemplary set of functional abstraction layers provided by the cloud computing environment shown in FIG. 6, in accordance with an embodiment of the present principles.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and unit of work continuity in event of initiating client fail over 796.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims:

The invention claimed is:

1. A method of providing unit of work continuity between a client device and a server when the client device initially fails to complete an ongoing unit of work, comprising:

temporarily storing, in a temporary storage location in the server, in-doubt messages sent to the server for the ongoing unit of work, when the client device disconnects from the server without committing the ongoing unit of work and in place of the client device resending the in-doubt messages to the server;

receiving, by the server from the client device, a respective one of unique hash codes, calculated by the client device, for each of the in-doubt messages; and utilizing the unique hash-codes to identify the in-doubt messages the client device had earlier sent to retrieve the in-doubt messages by the server from the temporary storage location and include the in-doubt messages as part of the ongoing unit of work to be committed by the client device, wherein the ongoing unit of work is only part of an entire transaction.

2. The method of claim 1, further comprising sending, by the server to the client device, a list of the unique hash-codes for the in-doubt messages that the server is temporarily storing.

3. The method of claim 2, further comprising waiting, by the server, for client device to indicate whether any of the unique hash codes in the list sent by the server to the client device are matching unique hash codes that match to the unique hash codes calculated by the client device for the in-doubt messages.

4. The method of claim 3, further comprising receiving, by the server from the client device, each of the matching unique hash codes in place of resending the respective one of the in-doubt messages corresponding thereto to eliminate message resending costs.

5. The method of claim 1, further comprising receiving, by the server from the client device an explicit indication to include the in-doubt messages as part of the ongoing unit of work to be committed by the client device.

6. The method of claim 1, further comprising:
receiving, by the server from the client device, a unique identifier of the client device; and
associating, by the server, the unique identifier with the in-doubt messages.

7. The method of claim 1, further comprising retrieving one or more of the in-doubt messages from the temporary storage location in the server responsive to the unique hash codes for the one or more of the in-doubt messages matching at both the server and the client device.

8. The method of claim 7, further comprising sending, from the server to the client device, an acknowledgement that one or more of the in-doubt messages have been successfully retrieved from the temporary storage location in the server, responsive to the one or more of the in-doubt messages being successfully retrieved from the temporary storage location in the server.

9. The method of claim 8, wherein the acknowledgement indicates that the one or more in-doubt messages are available at the server.

10. The method of claim 1, discarding, by the server, in the temporary storage location in the server, any of the in-doubt messages for which a respective one of the unique hash codes exists in the list, responsive to receiving, by the server from the client device, a commit instruction for the transaction that includes the ongoing unit of work now completed.

11. The method of claim 1, further comprising discarding the in-doubt messages from the temporary storage location in the server, responsive to an expiration of a pre-determined timeout constraint.

12. A computer program product for providing unit of work continuity between a client device and a server when the client device initially fails to complete an ongoing unit of work, the computer program product comprising a computer readable storage medium having program instructions embodied therewith, the program instructions executable by a computer to cause the computer to perform a method comprising:
temporarily storing, in a temporary storage location in the server, in-doubt messages sent to the server for the ongoing unit of work, when the client device disconnects from the server without committing the ongoing unit of work and in place of the client device resending the in-doubt messages to the server;
receiving, by the server from the client device, a respective one of unique hash codes, calculated by the client device, for each of the in-doubt messages; and
utilizing the unique hash-codes to identify the in-doubt messages the client device had earlier sent to retrieve the in-doubt messages by the server from the temporary storage location and include the in-doubt messages as part of the ongoing unit of work to be committed by the client device,
wherein the ongoing unit of work is only part of an entire transaction.

13. The computer program product of claim 12, further comprising sending, by the server to the client device, a list of the unique hash-codes for the in-doubt messages that the server is temporarily storing.

14. The computer program product of claim 13, further comprising waiting, by the server, for client device to indicate whether any of the unique hash codes in the list sent by the server to the client device are matching unique hash codes that match to the unique hash codes calculated by the client device for the in-doubt messages.

15. The computer program product of claim 14, further comprising receiving, by the server from the client device, each of the matching unique hash codes in place of resending the respective one of the in-doubt messages corresponding thereto to eliminate message resending costs.

16. The computer program product of claim 12, further comprising retrieving one or more of the in-doubt messages from the temporary storage location in the server responsive to the unique hash codes for the one or more of the in-doubt messages matching at both the server and the client device.

17. The computer program product of claim 16, further comprising sending, from the server to the client device, an acknowledgement that one or more of the in-doubt messages have been successfully retrieved from the temporary storage location in the server, responsive to the one or more of the in-doubt messages being successfully retrieved from the temporary storage location in the server.

18. The computer program product of claim 12, discarding, by the server, in the temporary storage location in the server, any of the in-doubt messages for which a respective one of the unique hash codes exists in the list, responsive to receiving, by the server from the client device, a commit instruction for the transaction that includes the ongoing unit of work now completed.

19. A system, comprising:
a hardware server, having a processor, configured to:
temporarily store, in a temporary storage location in the server, in-doubt messages sent to the server for an ongoing unit of work, when a client device disconnects from the server without committing the ongoing unit of work and in place of the client device resending the in-doubt messages to the server;
receive, by the server from the client device, a respective one of unique hash codes, calculated by the client device, for each of the in-doubt messages; and
utilize the unique hash-codes to identify the in-doubt messages the client device had earlier sent to retrieve the in-doubt messages by the server from the temporary storage location and include the in-doubt messages as part of the ongoing unit of work to be committed by the client device,
wherein the ongoing unit of work is only part of an entire transaction.

* * * * *